Jan. 30, 1962     A. A. WOLF     3,019,315
QUICK TRIP SWITCH
Filed June 24, 1958

INVENTOR.
Alfred A. Wolf
BY

United States Patent Office 3,019,315
Patented Jan. 30, 1962

3,019,315
QUICK TRIP SWITCH
Alfred Adams Wolf, York Township, York County, Pa., assignor, by mesne assignments, to Atlas Chemical Industries, Inc., a corporation of Delaware
Filed June 24, 1958, Ser. No. 744,272
11 Claims. (Cl. 200—97)

This invention relates to quick trip circuit breaking switches; and particularly to such switches suitable for use in blasting operations.

It is an object of this invention to provide a switch which will function as a circuit monitoring device and which will allow a short pulse of electrical energy to be supplied through the switch to the monitored circuit.

It is a further object of this invention to provide a switch which will limit the time that electrical energy is supplied to a blasting circuit to a very short interval.

It is a further object of this invention to provide a quick trip switch which will operate at a near constant time interval over a wide range of potential and current conditions.

It is a further object of the invention to provide a circuit breaking means for use in blasting circuits which will operate to break the circuit if a short is present in the blasting circuit.

The advantages of utilizing delay electric detonators to facilitate delay blasting, detonating certain charges of explosives prior to others in a successive progression of shots, is well known in the blasting art. A power line source of electrical energy is commonly used to initiate arrangements of delay electric detonators. A successful method of blasting utilizing a power line source of electrical energy is disclosed in application Serial Number 744,173 filed of even date herewith by D. M. McFarland entitled "A Method and Apparatus for Blasting." In accordance with the present invention, a quick trip switch is provided which will perform the blasting circuit breaking function required by the aforementioned patent application.

The invention comprises a double pole switch actuated by a control means which includes a solenoid coil shunted across the opposite sides of the load terminals of said switch, and a trip mechanism adapted to disconnect the load terminals from the line terminals. The solenoid coil is so positioned in relation to the trip mechanism that when activated by the passage of electrical current, it actuates the trip mechanism which in turn breaks the flow of electrical energy through the switch. The control means for actuating the said trip mechanism may further include a solenoid coil or coils mounted in one or both of the electrical lines connecting said switch in the circuit, the said additional solenoid coil or coils being mounted electrically in series with the circuit contacts of the said switch. The trip mechanism is so positioned in relation to the said series coil or coils that upon passage of an overload of electrical current through the circuit, such as would be caused by a short, the series coil is activated causing the trip mechanism to function and break the circuit.

The degree of activation of the shunt coil is directly proportional to the amount of current flowing through the shunt circuit. The amount of current flowing through the shunt circuit is directly proportional to the potential difference across the electrical supply lines. Therefore, the degree of activation of the shunt coil is directly proportional to the potential difference of the electrical supply lines and is substantially independent of any normal load in the circuit in which the switch is connected. The activation of the series coil or coils is directly proportional to the amount of current flow through the switch which is directly proportional to the circuit load.

The accompanying drawing illustrates in diagrammatic fashion two embodiments of the invention. Like characters of reference designate the corresponding parts throughout the several views.

Figure 1:
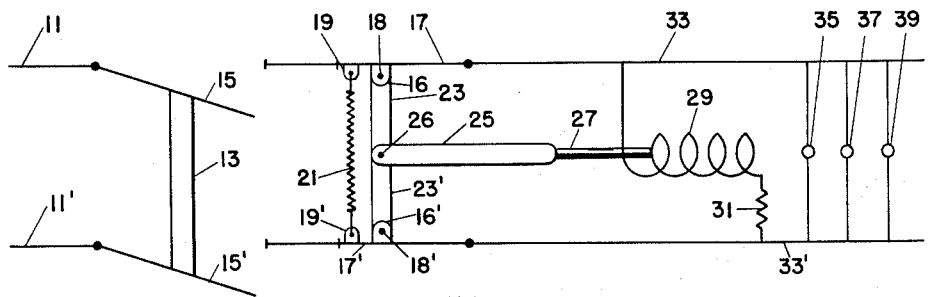
FIGURE 1 is a diagrammatic view of a quick trip switch of the invention mounted in an electrical circuit as it would appear ready to be actuated prior to connection with an electrical source.

Referring now to FIGURE 1: The electrical source circuit 11 and 11' is led to a double pole connecting switch 13 having dual contacts 15 and 15', facilitating the connection of a parallel arrangement of delay electric detonators 35, 37 and 39 through the blasting circuit connecting lines 33 and 33'. Interposed in said connecting lines 33 and 33', between the double pole switch 13 and the detonator arrangement 35, 37 and 39 is a quick trip switch. The said quick trip switch is comprised of dual circuit contacts 17 and 17' having electrically non-conducting spring holders 19 and 19' mounted thereon, and a spring 21 mounted across said spring holders 19 and 19'. The tension on said spring 21 tending to draw circuit contacts 17 and 17' inward toward a tripped, or open, position. Said circuit contacts 17 and 17' having electrically non-conducting trip levers 23 and 23' connected thereto through pivot members 16 and 16' by pins 18 and 18', said trip levers 23 and 23' being pivotally connected to an arm member 25 by pin 26. The opposite end of said arm member 25 being affixed to a metal armature member 27 extending inside the loops of a solenoid coil 29 and positioned to move along the center axis thereof, said coil 29 being connected in series with a resistance 31 across the blasting circuit connecting lines 33 and 33'. When the circuit connecting switch 13 is closed, electrical energy flows from the electrical source circuit 11 and 11' through circuit contacts 17 and 17' and the blasting circuit connecting lines 33 and 33' to the delay electric detonator arrangement 35, 37 and 39.

Figure 2:
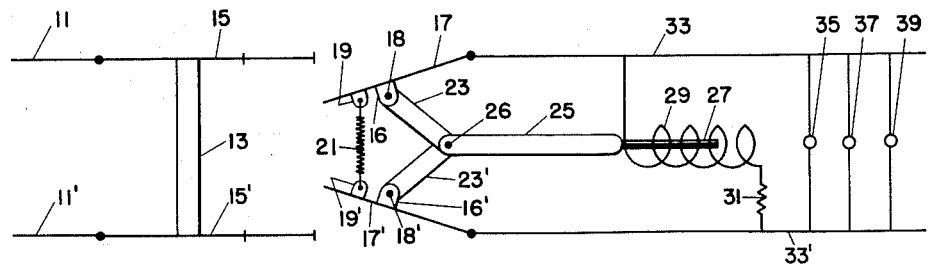
FIGURE 2 is a diagrammatic view of the quick trip switch of FIG. 1 in a tripped, or open, position, the trip mechanism having been actuated by activation of the shunt coil.

Referring now to FIGURE 2: Immediately upon the application of current to the switch, solenoid coil 29 which is shunted across connecting lines 33 and 33' is activated and tends to draw armature member 27 further within said coil 29. The movement of armature member 27 causes arm member 25 to move toward solenoid coil 29. The coilward movement of arm member 25 causes trip levers 23 and 23' to move inward. The inward movement of trip levers 23 and 23' causes a corresponding inward movement of switch circuit contacts 17 and 17', thus, breaking the electric connection through the quick trip switch by removing circuit contacts 17 and 17' from the circuit. The inward movement and circuit breaking action of switch circuit contacts 17 and 17' is further hastened by the tension on spring 21.

Figure 3:
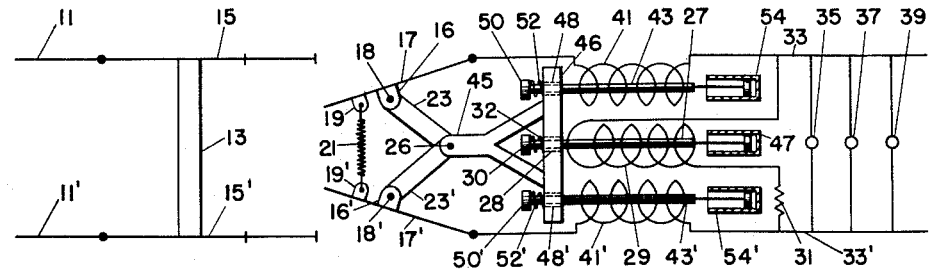
FIGURE 3 shows a diagrammatic view of a quick trip switch similar to that shown in FIG. 1 with added series solenoid coils and damping means attached to the switch armature members. The switch is shown in a tripped, or open, position.

Referring now to FIGURE 3: This figure demonstrates a form of the invention wherein the quick trip switch includes solenoid coils 41 and 41' mounted in series with connecting lines 33 and 33' and arranged in series with said switch. FIGURE 3 shows a modification of the trip mechanism arrangement in the quick trip switch so that the circuit breaking action of circuit contacts 17 and 17' may be initiated by activation of the added series solenoid coils 41 and 41'. The said series coils 41 and 41' are each provided with a metal armature member 43 and 43', positioned inside the loops of said coils and arranged to move along the center axis of said coils. Upon the application of sufficient current to coils 41 and 41', armatures 43 and 43' tend to be drawn inward into said coils. Armature members 43 and 43' are adapted to slidably be engaged by holes 48 and 48' of crossbar 46. Said armature members 43 and 43' having terminal heads 50 and 50' of larger cross-sectional area than holes 48 and 48' of crossbar 46. Take-up springs 52 and 52' are mounted on armature members 43 and 43' between terminal heads 50 and 50' and crossbar 46. The bifurcated end of a Y-shaped arm 45 is attached to crossbar 46. The stem end of said Y-shaped arm 45 is pivotally attached to trip levers 23 and 23'. In case of a prolonged heavy overload or a short circuit occurring between lines 33 and 33' or between one of them and ground, one or both of the series coils 41 and 41' will be sufficiently activated to draw armature members 43 and 43' further within its respective coil against the retarding effect of dashpot assemblies 54 and 54'. Coilward movement of said armature members 43 and 43' causes springs 52 and 52' to be compressed and further coilward movement of said armature members causes crossbar 46 to be moved coilward. Y-shaped arm 45, being affixed to crossbar 46 is also caused to move toward coils 41 and 41'. Such coilward movement of Y-shaped arm 45 causes a responsive inward movement of trip levers 23 and 23'. The inward movement of trip levers 23 and 23' causes a corresponding inward movement of circuit contacts 17 and 17', thus breaking the electrical connection through the quick trip switch at switch circuit contacts 17 and 17'. FIGURE 3 shows a shunt solenoid coil 29 mounted in series with an electrical resistance 31 across the switch circuit. Shunt coil 29 contains a metal armature member 27, said armature member 27 being slidably engaged in hole 28 of crossbar 46 and having a terminal head 30 of larger cross sectional dimension than the diameter of hole 28. Take-up spring 32 is mounted on armature member 27 between said crossbar 46 and said terminal head 30. Upon a flow of current through the shunt coil 29, armature member 27 tends to move further within the coil and acting against the retarding effect of dashpot assembly 47, causes compression of take-up spring 32. Further coilward movement of said armature member 27 causes a responsive movement of crossbar 46 toward coil 29. Y-shaped arm 45 being affixed to said crossbar 46 is also caused to move coilward. Coilward movement of Y-shaped arm 45 causes trip levers 23 and 23' to move inward and break the circuit at dual switch circuit contacts 17 and 17'.

In some blasting operations utilizing the herein described quick trip switch the circuit breaking action may occur too fast to insure proper activation of an arrangement of delay electric detonators. This situation may frequently occur when a direct current source of electrical current is used. The circuit breaking action of the switch may be slowed by means of a suitable retarding mechanism positioned in relation to any of the moving parts of the switch. Preferably the circuit breaking action of the switch is slowed by retarding the movement of one or more of the solenoid coil armature members by means of a dashpot assembly. Such means are shown in FIGURE 3 described above.

The quick trip switches shown in the above described figures are designed to break the flow of electric current from 5 to 200 milliseconds after the device is connected to an electrical source. In normal operation of the quick trip switch described in FIGURE 3, the series coils 41 and 41' will not interrupt the flow of current through the switch. The series coil damping means, dashpot assemblies 54 and 54', shown in FIGURE 3, are adjusted to insure that for normal values of current passing through the switch that the effect of shunt coil 29 on the breaking mechanism is not preceded by the effect of series coils 41 and 41'. The action of said series coils will cause disruption of the current flow only in case of a prolonged heavy overload or in case of a short occurring in the blasting circuit connecting lines 33 and 33'.

The sensitivity of the shunt coil may be finely adjusted by various means such as: varying the type of wire used, by varying the number of turns in the shunt coil by adjusting the damping means or by varying an electrical resistance mounted in the shunt coil circuit. The latter means is a preferred method of finely adjusting the sensitivity of the shunt coil.

A preferred form of the invention may be produced by adapting a commercially available three phase circuit breaker to perform the required quick break function. A circuit breaker manufactured by the Heinemann Electric Company, Trenton, New Jersey, Heinemann catalog number 343,363, is readily adaptable. This model is designed to separately monitor the current flow through the breaker of each phase of a three phase electrical source. The device consists of a trip switch having three contacts, one for each monitored line, and three series coil assemblies, one mounted in each of the monitored lines, the said series coil assemblies being mechanically connected to the trip switch so that activation of any of the three series coils will cause the trip switch to function and disrupt the flow of electrical current through the device.

The adaptation of the Heinemann three pole circuit breaker into a two pole quick trip switch may be made, for example, by removing one of the three series coil assemblies and the electrical connections attached thereto and mounting a solenoid coil having 1,000 turns of No. 30 wire and in series with a 25 ohm 50 watt resistance across the two remaining lines. The added 1,000 turn shunt coil is positioned so that activation of the said shunt coil will cause the circuit breaking mechanism to function. It was found that a Heinemann circuit breaker modified as described above, while operating in a range of from 200 to 430 volts with circuit loads of up to 100 amperes, will disrupt the flow of electrical energy through the device 10–100 milliseconds after connection is made with an electrical source.

The invention has been described schematically and also in connection with a specific practical embodiment thereof. It is obvious, however, that many variations and modifications of the invention will now be clear to those skilled in the art. Therefore, the invention should not be considered limited by the specific description herein but only by the appended claims.

What is claimed is:

1. A switch means for allowing a short burst of electrical energy through an electrical circuit in which the switch is mounted comprising a quick trip switch having a pair of load terminals and a pair of line terminals, a pair of circuit contacts having an open position and a closed position, a trip mechanism therefor, and a solenoid coil, said solenoid coil being electrically shunted across the said switch at a point between said circuit contacts and said load terminals so as to be responsive to the imposition of an electrical potential on said switch when said electrical contacts are in a closed position, said trip mechanism being arranged so that activation of the solenoid coil actuates the trip mechanism which opens said circuit contacts.

2. A switch means in accordance with claim 1 including a damping means attached to a movable part of the switch and so arranged that the circuit breaking movement of the circuit contacts of said switch means is retarded.

3. A switch in accordance with claim 1 including a second solenoid coil electrically connected in a series manner in said quick trip switch so as to be responsive to a flow of electrical current through said switch and so arranged that the trip mechanism may be actuated by said second solenoid coil.

4. A switch in accordance with claim 1 having series solenoid coils mounted on opposite sides of said switch and so arranged that activation of either of said series coils actuates the trip mechanism of said switch.

5. A switch means for allowing a single short burst of electrical energy through an electrical circuit in which the switch is mounted which comprises a switch having a pair of load terminals and a pair of circuit contacts having an open position and a closed position, a solenoid coil electrically shunted across said switch at a point between said circuit contacts and said load terminals so as to be responsive to the imposition of electrical potential on said switch when said circuit contacts are in closed position, said circuit contacts being operatively arranged in relation to said solenoid coil so that activation of the solenoid coil causes the said circuit contacts to open and disrupt the flow of electrical current through the switch.

6. A switch in accordance with claim 5 wherein a second solenoid coil is electrically connected in said switch so as to be responsive to a flow of electrical current through said switch, said second solenoid coil being arranged so that activation of said coil causes disconnection of said circuit contact means and disrupts the flow of electrical current through the switch.

7. A switch in accordance with claim 5 having two solenoid coils mounted in series with said circuit contact means and positioned on opposite sides of said switch so that activation of either of said solenoid coils causes activation of the trip mechanism.

8. A switch means in accordance with claim 5 including a damping means attached to a movable part of the switch and so arranged that the circuit breaking movement of the circuit contacts of said switch means is retarded.

9. A switch means for allowing a single short burst of electrical energy through an electrical circuit comprising a quick trip switch having a pair of circuit contacts, a trip mechanism therefor, a solenoid coil assembly comprising a solenoid coil and an armature member arranged to be moved by said solenoid coil, the said solenoid coil being electrically connected across said switch, so as to be responsive to the imposition of an electrical potential on said switch, said trip mechanism being attached to said circuit contacts and operated in response to movement of said armature member so that upon activation of said solenoid coil, movement of the armature member actuates said trip mechanism and disrupts the flow of electrical current through said switch.

10. A switch means in accordance with claim 9 including a damping means attached to a movable part of the switch and so arranged that the circuit breaking movement of the circuit contacts of said switch means is retarded.

11. A switch in accordance with claim 9 wherein the movement of the armature is retarded by means of a damping assembly.

References Cited in the file of this patent

UNITED STATES PATENTS

| | | |
|---|---|---|
| 741,814 | Moore | Oct. 20, 1903 |
| 837,854 | Larson | Dec. 4, 1906 |
| 963,859 | Burrows et al. | July 12, 1910 |
| 977,577 | Wikander | Dec. 6, 1910 |
| 1,081,402 | Porter | Dec. 16, 1913 |
| 1,643,415 | Moore | Sept. 27, 1927 |
| 1,932,119 | Reed | Oct. 24, 1933 |
| 2,171,114 | Jones | Aug. 29, 1939 |